US012208592B2

(12) United States Patent
Syers et al.

(10) Patent No.: US 12,208,592 B2
(45) Date of Patent: Jan. 28, 2025

(54) PACKAGING BLANKS FOR CONTAINERS ARRAYED FOR ROTARY DIE CUTTERS

(71) Applicant: WestRock Shared Services, LLC, Atlanta, GA (US)

(72) Inventors: Jonathan Syers, Carol Stream, IL (US); Timothy A. Tripp, Kansas City, MO (US)

(73) Assignee: WestRock Shared Services, LLC, Atlanta, GA (US)

( * ) Notice: Subject to any disclaimer, the term of this patent is extended or adjusted under 35 U.S.C. 154(b) by 78 days.

(21) Appl. No.: 18/195,601

(22) Filed: May 10, 2023

(65) Prior Publication Data

US 2024/0375368 A1 Nov. 14, 2024

(51) Int. Cl.
*B65D 5/20* (2006.01)
*B31B 50/16* (2017.01)
*B65D 5/54* (2006.01)

(52) U.S. Cl.
CPC ................ *B31B 50/16* (2017.08); *B65D 5/20* (2013.01); *B65D 5/5495* (2013.01); *B65D 2301/10* (2013.01)

(58) Field of Classification Search
USPC ........................................................... 493/74
See application file for complete search history.

(56) References Cited

U.S. PATENT DOCUMENTS

| | | | | |
|---|---|---|---|---|
| 2,987,176 | A * | 6/1961 | Ringler | B65D 71/16 206/428 |
| 5,417,640 | A * | 5/1995 | Martin | B31B 50/252 493/401 |
| 2010/0263333 | A1 * | 10/2010 | Langen | B65D 5/02 53/563 |
| 2015/0174847 | A1 * | 6/2015 | Thum | B65D 5/547 493/52 |
| 2018/0339416 | A1 * | 11/2018 | Bormann | B26D 7/018 |

* cited by examiner

*Primary Examiner* — Chinyere J Rushing-Tucker
(74) *Attorney, Agent, or Firm* — Neil G. Cohen; Rohini K. Garg

(57) ABSTRACT

An array of packaging blanks for containers includes a first set of one or more packaging blanks and a second set of one or more packaging blanks. A strut between the first set the second set is connected to the first set by a first line of weakness configured to be broken to separate the first set from the strut. The strut is connected to the second set by a second line of weakness configured to be broken to separate the second set from the strut.

15 Claims, 11 Drawing Sheets

PACKAGING BLANKS FOR CONTAINERS ARRAYED FOR ROTARY DIE CUTTERS

BACKGROUND

1. Field

The present disclosure relates to blanks such as used in forming containers, and more particularly to blanks that are cut from stock material by rotary die cutters.

2. Description of Related Art

When forming container blanks from stock sheets of corrugated board material or the like, there are traditionally two types of dies that perform the cutting. Flatbed cutting dies are planar and are pressed against each sheet of stock material, with a reciprocating motion one at a time. Rotary cutting dies have a cylindrical shape and a web or individual sheets of stock are feed to the rotary cutting die, which typically produces the blanks continuously as it rotates. Rotary die cutters traditionally produce blanks at a faster rate that the flatbed die cutters. However, rotary die cutters have traditionally had a minimum size of blank that can be produced without fowling or jamming the machine. As such, small blank sizes have traditionally been produced using the slower flatbed cutting die process.

The conventional techniques have been considered satisfactory for their intended purpose. However, there is an ever present need for improved systems and methods for producing blanks for containers. This disclosure provides a solution for this need.

SUMMARY

An array of packaging blanks for containers includes a first set of one or more packaging blanks and a second set of one or more packaging blanks. A strut between the first set the second set is connected to the first set by a first line of weakness configured to be broken to separate the first set from the strut. The strut is connected to the second set by a second line of weakness configured to be broken to separate the second set from the strut.

Each packaging blank in the first and second sets can include a main panel and a plurality of wall panels each foldably connected to the main panel. The plurality of wall panels can be configured to be erected along respective fold lines about an interior space in cooperation with the main panel to form a respective container. The strut can be rectangular and can connect to one respective wall panel of each of the packaging blanks in the first and second sets. The strut can have two long edges and two short edges. The long edges can be connected to the one respective wall panel of each of the packaging blanks in the first and second sets.

The first set can include two packing blanks connected to one another along a line of weakness connecting wall panels of the two packaging blanks. The second set can include two packaging blanks connected to one another along a line of weakness connecting wall panels of the two wall panels of the second set. The first and second lines of weakness can each include at least one micro-perforated portion. The first and second lines of weakness can each include an alternating pattern of cut portions and micro-perforated portions. Each of the packaging blanks of the first and second sets can include a single shaped panel for use as a basepad. Each of the packaging blanks of the first and second sets can include a plurality of foldably connected panels configured for use as an interconnecting divider or multiwall interconnecting divider.

A palletized product includes a pallet and a stack of arrays of packaging blanks. Each array of stacking blanks in the stack can be as described above. The struts of each of the arrays of packaging blanks are aligned.

A method includes feeding a stream of stock material sheets to a rotary die cutter and cutting each sheet in the stream of stock material sheets into an array of packaging blanks as described above. The method includes collecting a batch of the arrays of packaging blanks from the rotary die cutter into a stack a hopper, opening a pair of ledges of the hopper to drop the stack down onto a conveyor, and conveying the stack away from the rotary die cutter and from the hopper.

A gap with a first width can separate the pair of ledges of the hopper. The packaging blanks of the arrays of packaging blanks can each have a widest width that is narrower than the first width. Each of the arrays of packaging blanks can have a widest width that is wider than the first width to suspend the stack across the gap. The first and second lines of weakness can be strong enough to suspend the stack across the gap, but weak enough to break when separating the packaging blanks from the struts rather than tearing the packaging blanks or the struts. The method can include palletizing the stack for shipping.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1A:
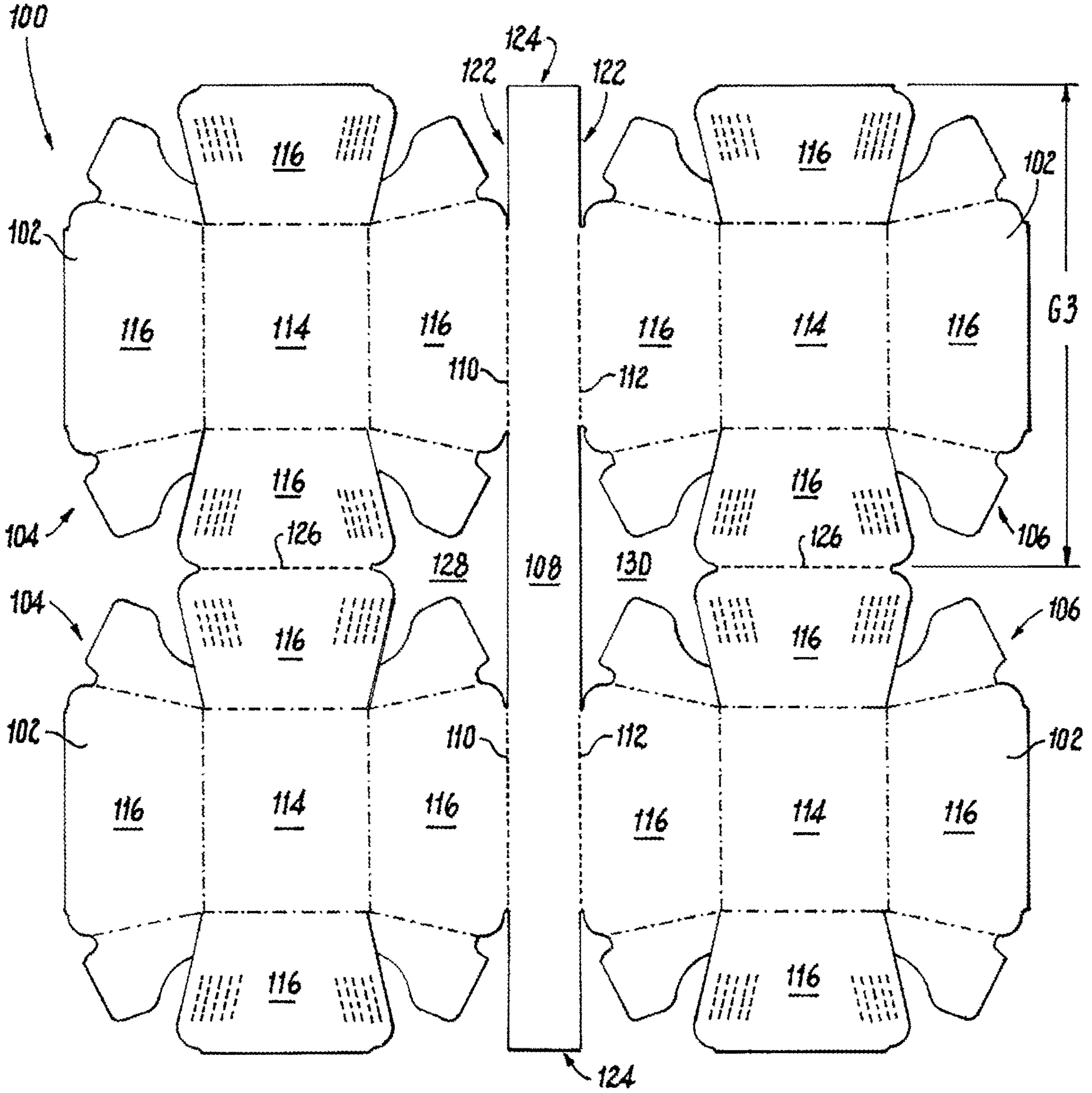
FIG. 1*a* is a plan view of an embodiment of an array of packaging blanks constructed in accordance with the present disclosure, showing the strut connecting the packaging blanks together in the array.

Reference will now be made to the drawings wherein like reference numerals identify similar structural features or aspects of the subject disclosure. For purposes of explanation and illustration, and not limitation, a partial view of an embodiment of an array of packaging blanks in accordance with the disclosure is shown in FIGS. 1*a* and 1*s* designated generally by reference character 100. Other embodiments of systems in accordance with the disclosure, or aspects thereof, are provided in FIGS. 1*b*, 1*c*, and 2-10, as will be described. The systems and methods described herein can be used to cut packaging blanks on a rotary cutting die wherein the packaging blanks are too small for traditional methods of using the rotary cutting dies.

Figure 1B:
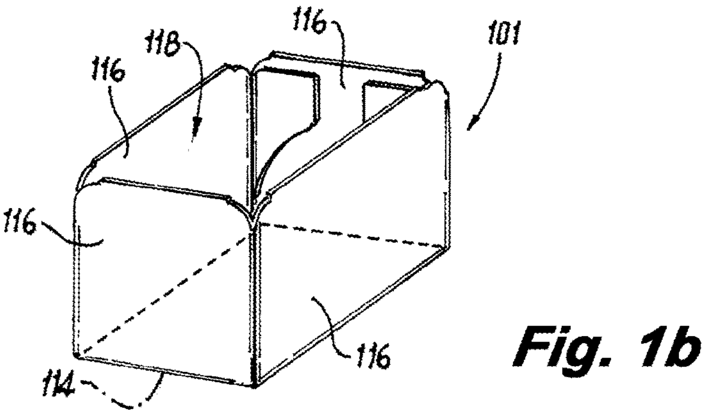
FIG. 1*b* is a perspective view of a container constructed from one of the packaging blanks of FIG. 1*a;*

The array 100 of packaging blanks 102 for containers 101 (one of which is depicted in FIG. 1*b*) includes a first set 104 of one or more packaging blanks 102 and a second set 106 of one or more packaging blanks 102. A strut 108 between the first set 104 the second set 106 is connected to the first set 104 by a first line of weakness 110 configured to be broken to separate the first set 104 from the strut 110. The strut 108 is connected to the second set 106 by a second line of weakness 112 configured to be broken to separate the second set 106 from the strut 108.

Each packaging blank 102 in the first and second sets includes a main panel 114 and a plurality of wall panels 116 each foldably connected to the main panel 114. As shown in FIG. 1*b*, the plurality of wall panels 116 are configured to be erected along respective fold lines about an interior space 118 in cooperation with the main panel 114 to form a respective container 101. Flaps 120 foldably connected to at least some of the wall panels 116 overlapped with adjacent wall panels 116 and affixed in place, e.g. with glue, to keep the container 101 formed. As shown in FIG. 1*a*, the strut 108 is rectangular and connects to one respective wall panel 116 of each of the packaging blanks 102 in the first and second sets 104, 106. The strut has two long edges 122 and two short edges 124. The long edges 122 are connected to the one respective wall panel 116 of each of the packaging blanks 102 in the first and second sets 104, 106.

Figure 1C:
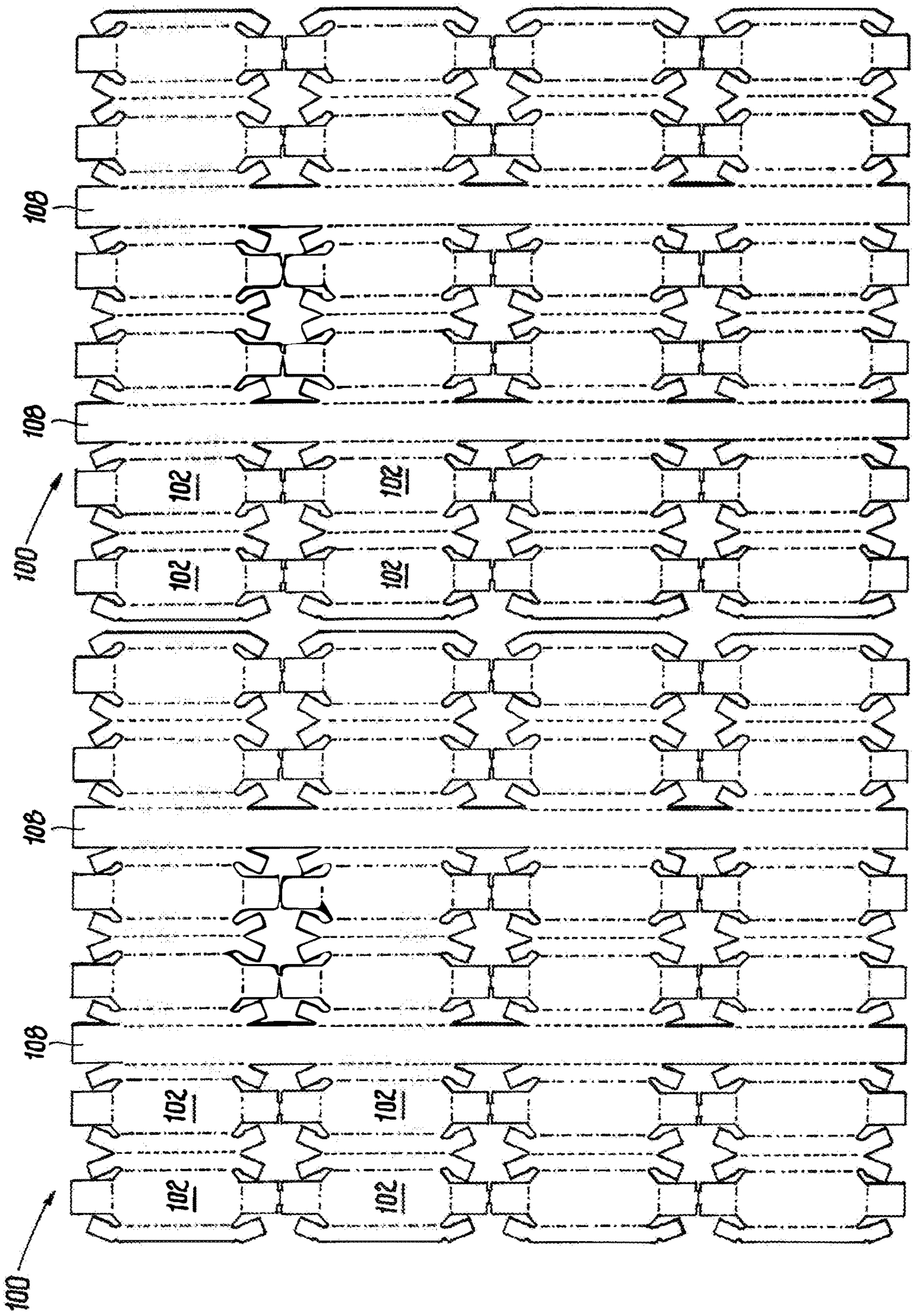
FIG. 1*c* is a plan view of an embodiment of an array of packaging blanks constructed in accordance with the present disclosure, showing multiple struts to an array.

The first set 104 includes two packing blanks 102 connected to one another along a line of weakness 126 connecting wall panels 116 of the two packaging blanks 102. The second set 106 similarly includes two packaging blanks 102 connected to one another along a line of weakness 126 connecting wall panels 116 of the two wall panels of the second set 106. The first and second lines of weakness 110, 112 as well as the lines of weakness 126 can each include at least one micro-perforated portion, an alternating pattern of cut portions and micro-perforated portions, or any other suitable type of line of weakness. The line of weakness 110 for the first and second set 104 is interrupted by a void 128 bounded by the two blanks 102 of the first set 104 and the strut 108. The line of weakness 112 for the second sets 106 is interrupted by a void 130 bounded by the two blanks 102 of the second set 106 and the strut 108. Those skilled in the art will readily appreciate that while the array 100 includes two sets 104, 106 of two blanks 102 each, any suitable number of blanks can be included without departing from the scope of this disclosure. Moreover, those skilled in the art will readily appreciate that any suitable type of blanks 102 can be included. In FIG. 1*c*, similar packaging blanks 102 to those described above with respect to FIG. 1*a* are connected, however, each array 100 has multiple struts 108. In addition, two arrays 100 can be cut in a rotary die cutter at one time in a side by side manner, as depicted in FIG. 1*c*. Additional examples of blanks types are described below with reference to FIGS. 2-4.

Figure 2:
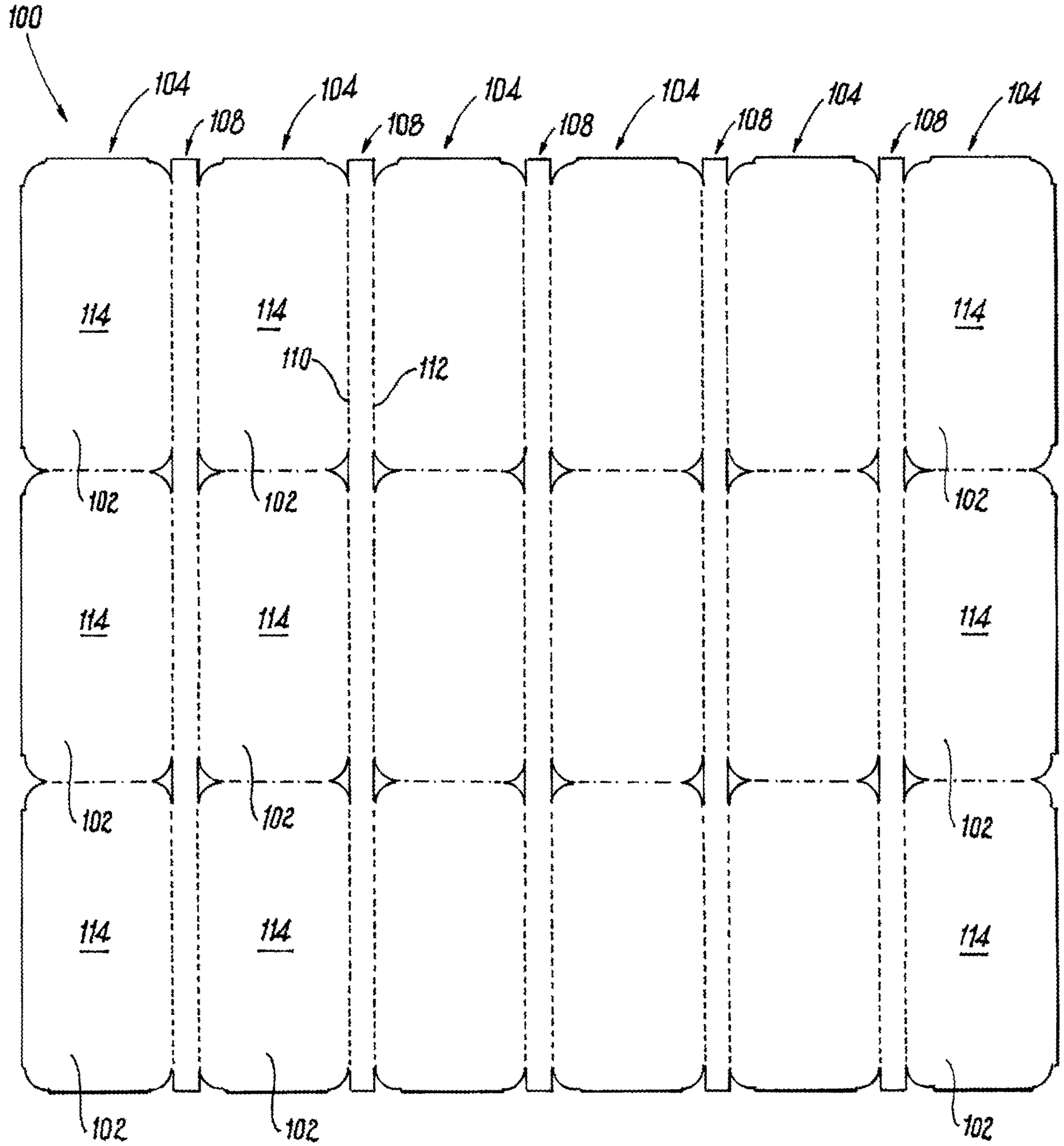
FIG. 2 is a plan view of another embodiment of an array of packaging blanks constructed in accordance with the present disclosure, showing the struts connecting the packaging blanks together in the array.
Figure 3:
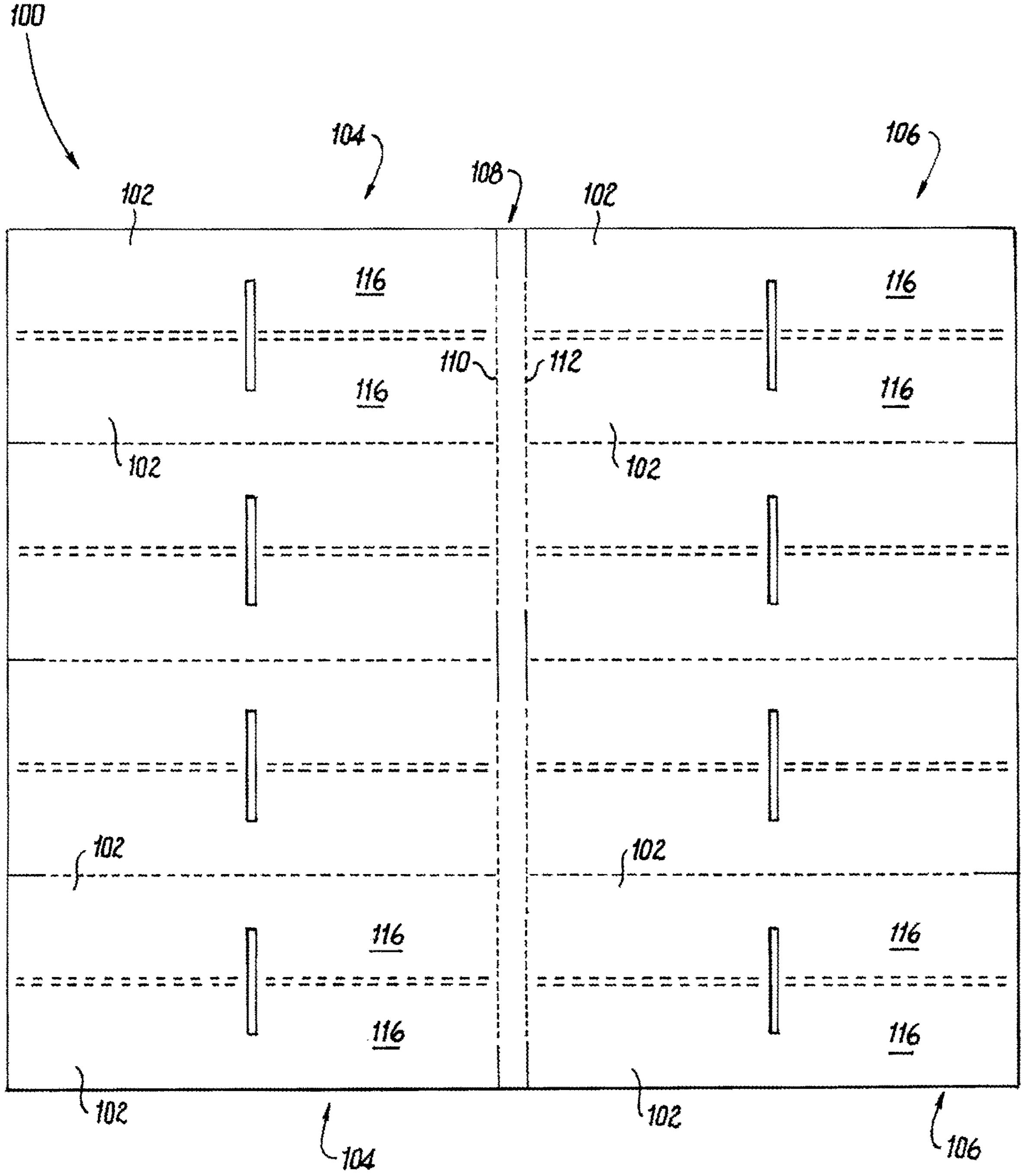
FIG. 3 is a plan view of another embodiment of an array of packaging blanks constructed in accordance with the present disclosure, showing the strut connecting the packaging blanks together in the array.
Figure 4:
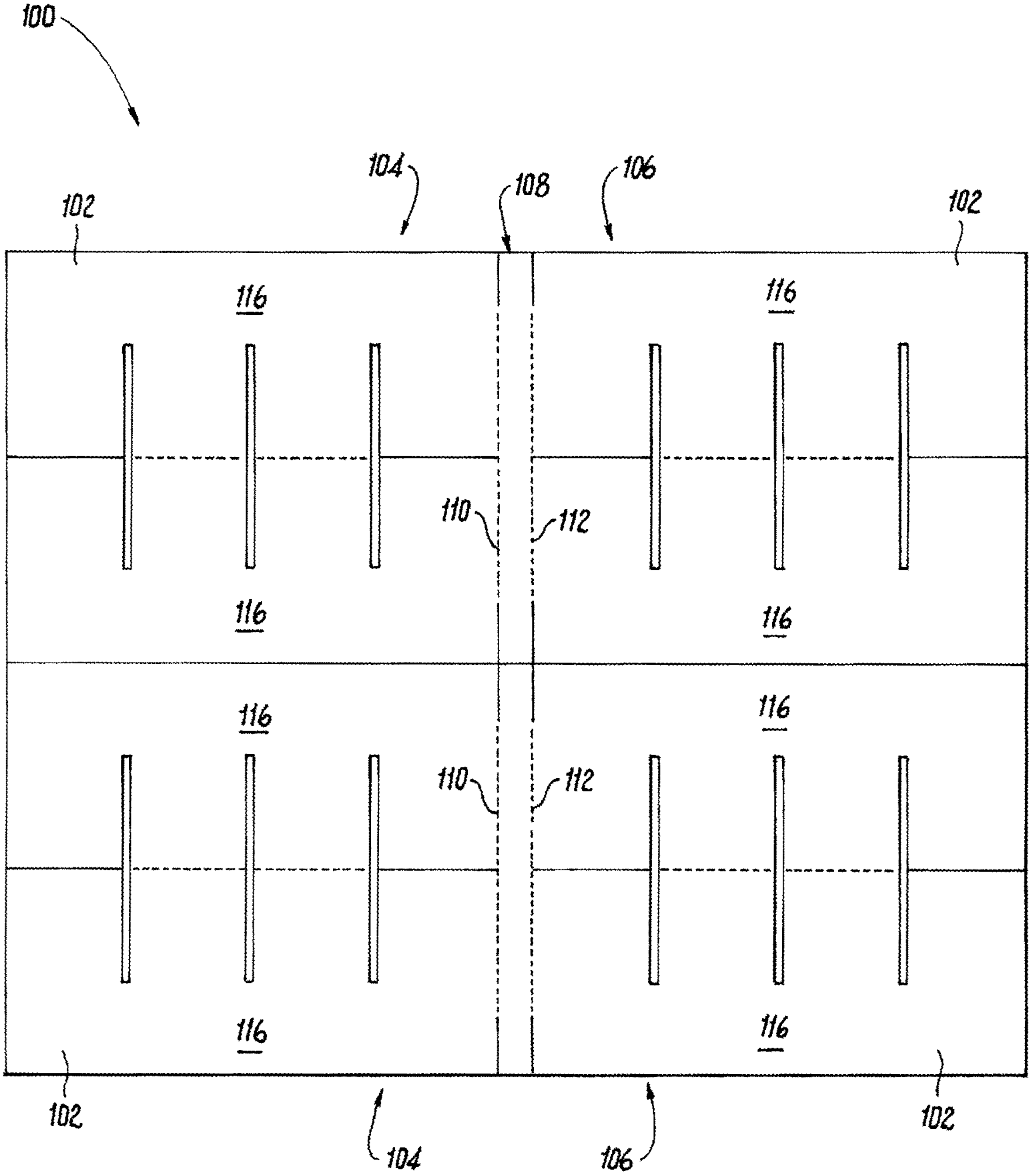
FIG. 4 is a plan view of another embodiment of an array of packaging blanks constructed in accordance with the present disclosure, showing the strut connecting the packaging blanks together in the array.

In FIG. 2, there are three packaging blanks 102 in each of six sets 104 separated from one another by struts 108. Each of the packaging blanks 102 includes a single shaped panel 114 for use as a basepad, e.g. for yogurt or water bottles that are set on top of the basepad and shrink wrapped directly to the basepad, with no other walls, lid, or folding required for packaging. In FIG. 3, each of the four packaging blanks 102 of each of the first and second sets 104, 106 includes a plurality of foldably connected panels 116 configured for use as an interconnecting divider, e.g., placed inside a separate carton to separate customer product from touching or to keep product from mixing. In FIG. 4 a similar array 100 is shown to that in FIG. 2 but with only two blanks 102 in each of the two sets 104, 106. This configuration of the blanks 102 is for is a multiwall interconnecting divider, placed inside a separate carton, such as for packaging be wine bottles, ball jars, or the like.

Figure 5:
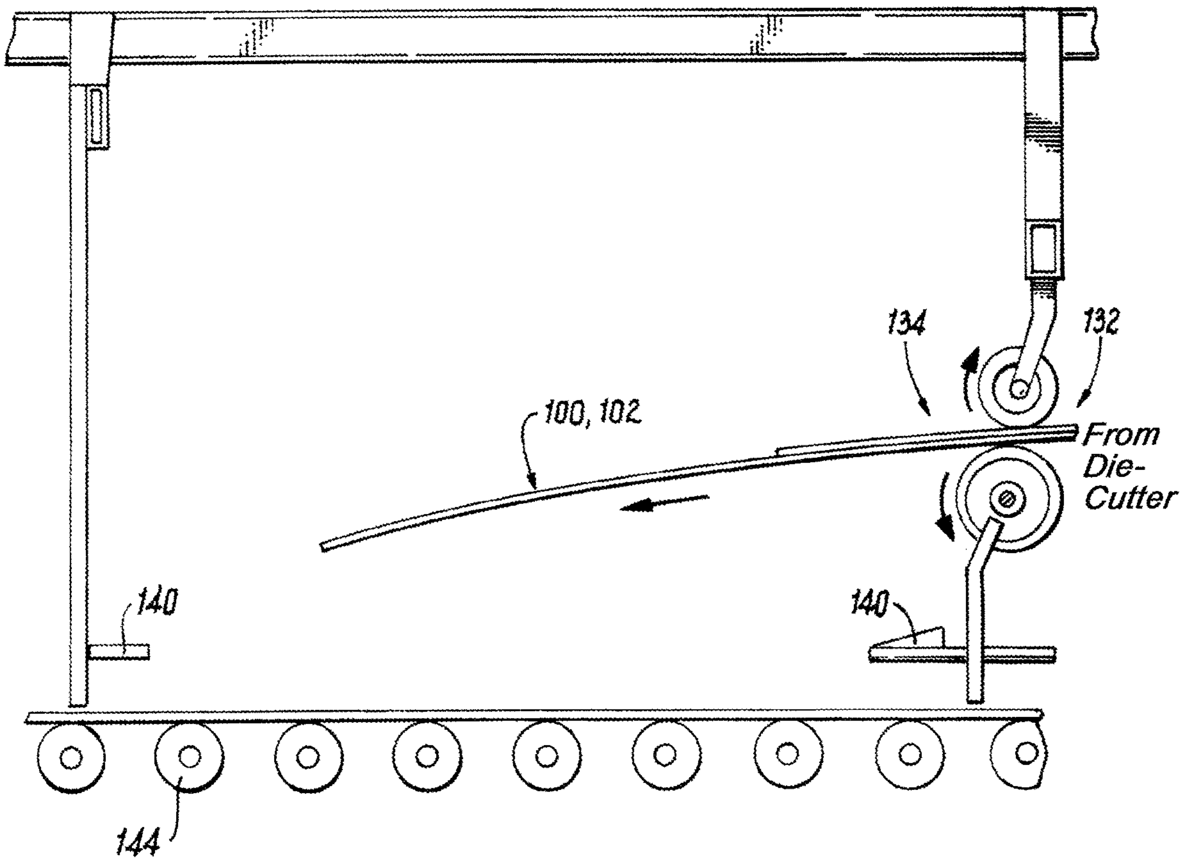
FIG. 5 is a schematic side elevation view of one of the arrays of packaging blanks of FIGS. 1-4 in a process, showing the array of packaging blanks after being cut by a rotary die cutter.
Figure 6:
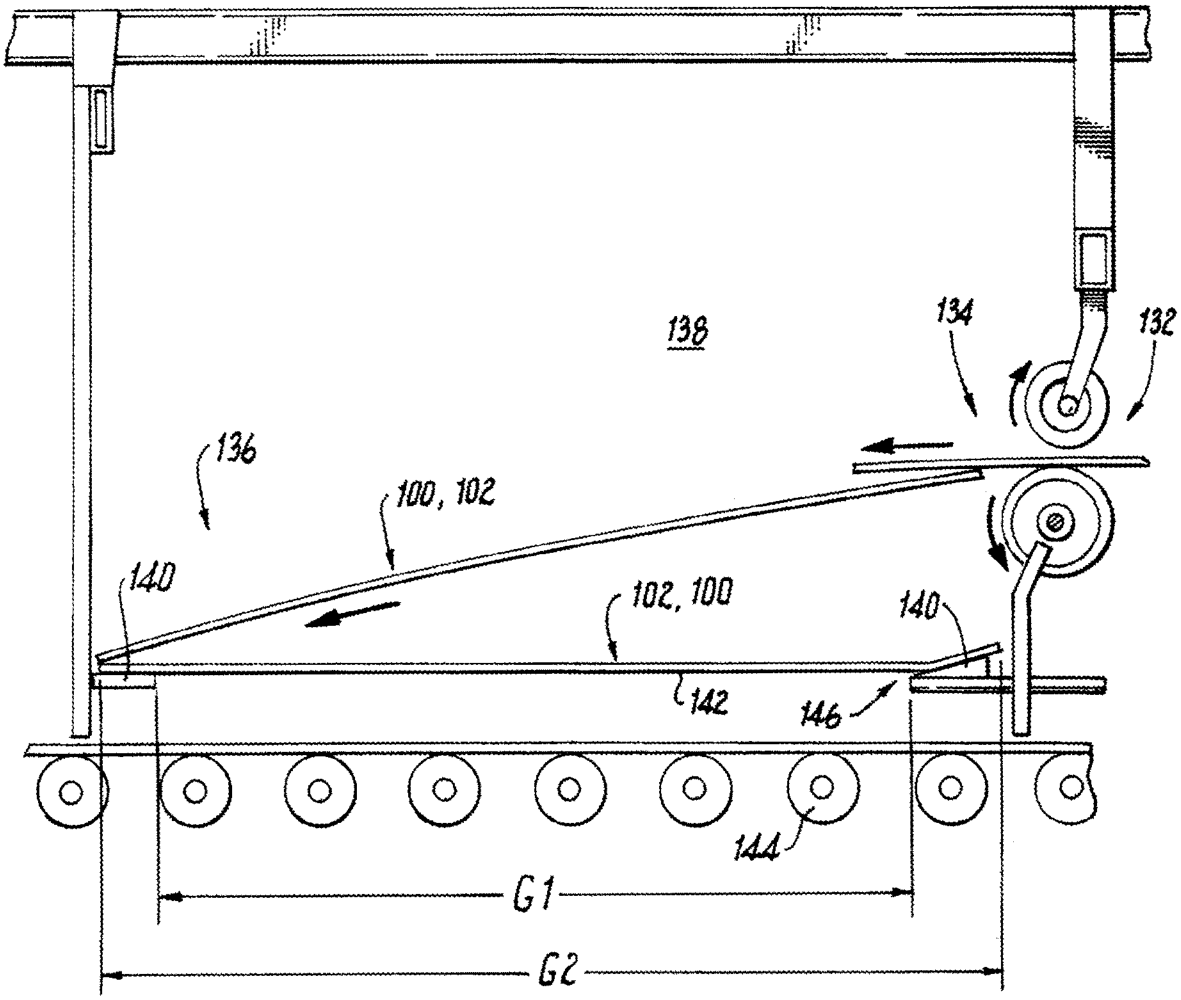
FIG. 6 is a schematic side elevation view of the process of FIG. 5, showing the array of packaging blanks of FIG. 5 seated across a gap above a conveyor as an additional array of packaging blanks is cut by the rotary die cutter.
Figure 7:
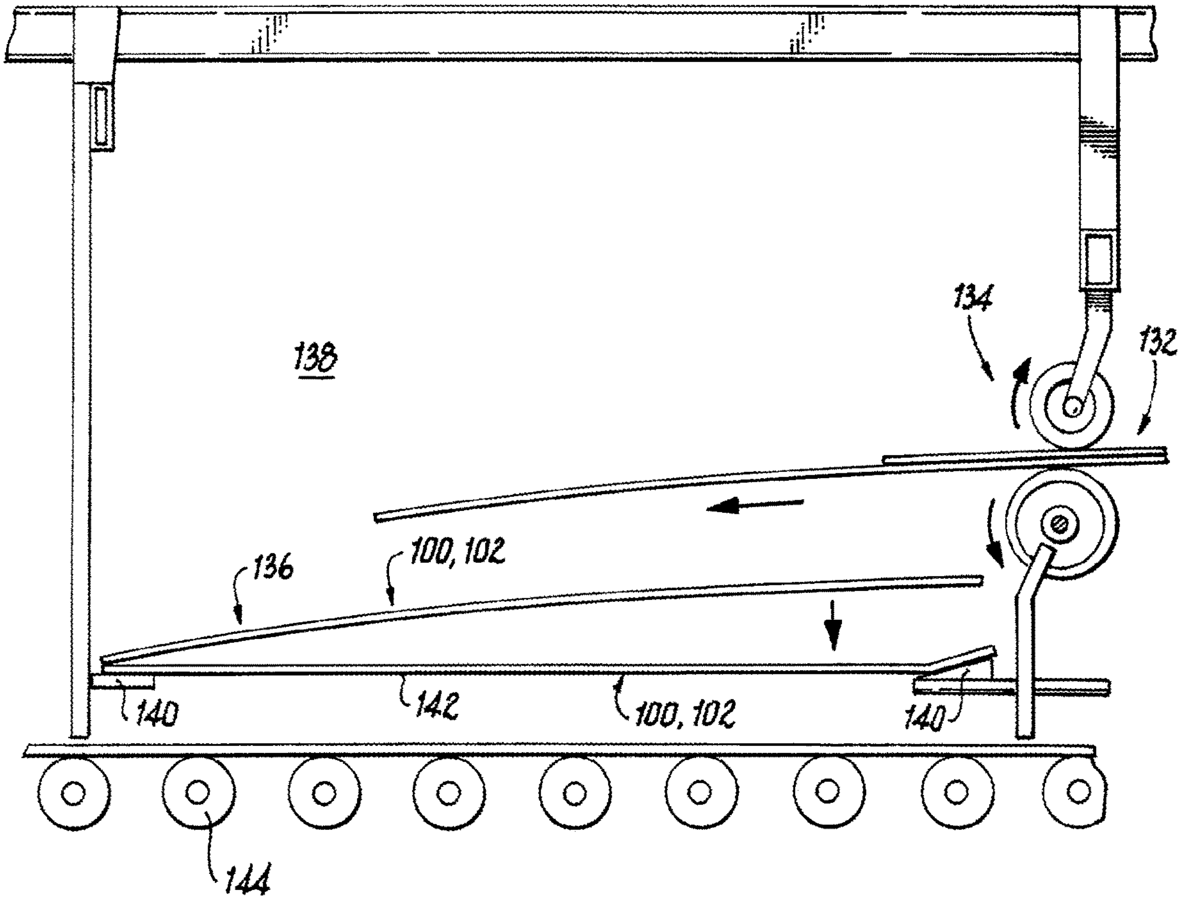
FIGS. 7-8 show a continuance of the process of cutting arrays of packaging blanks as in FIGS. 5-6, wherein the struts of the arrays of packaging blanks keep the arrays of packaging blanks suspended above the conveyor.
Figure 8:
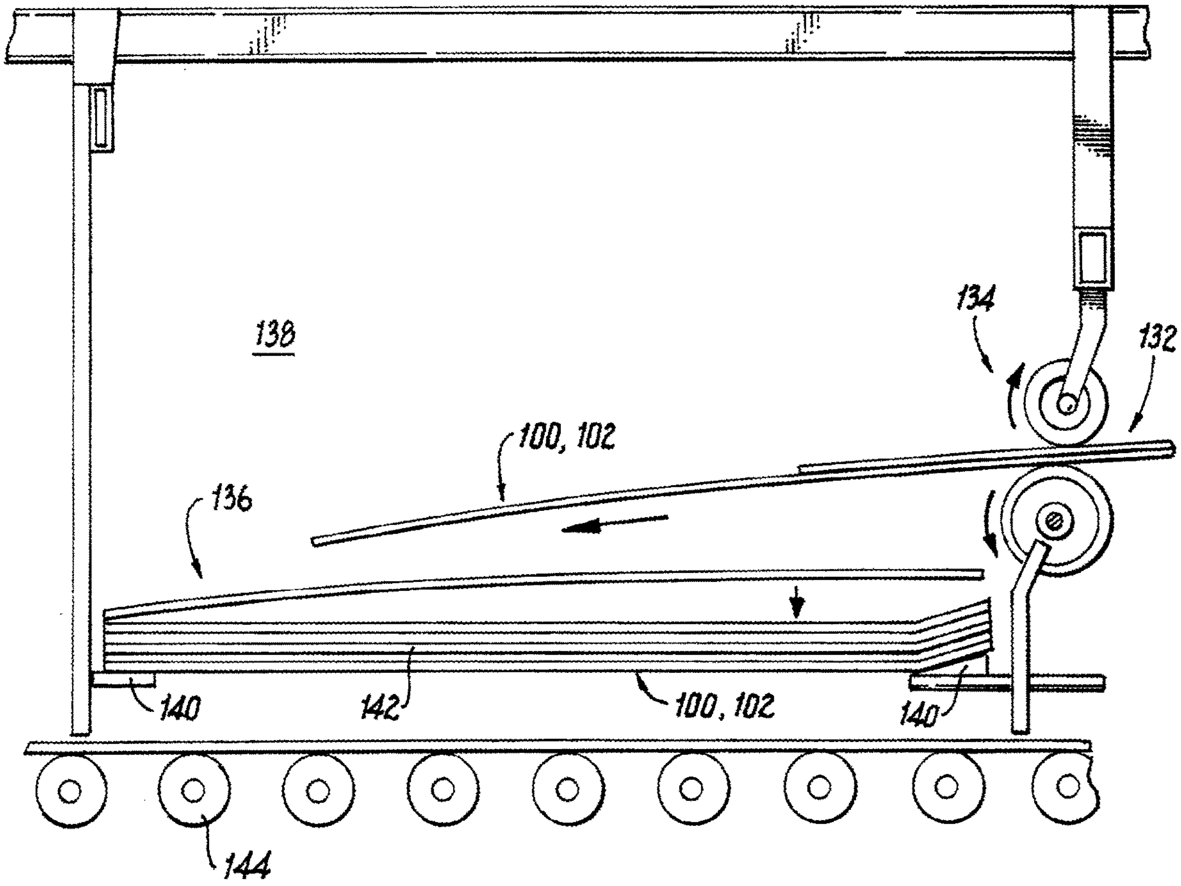
Figure 9:
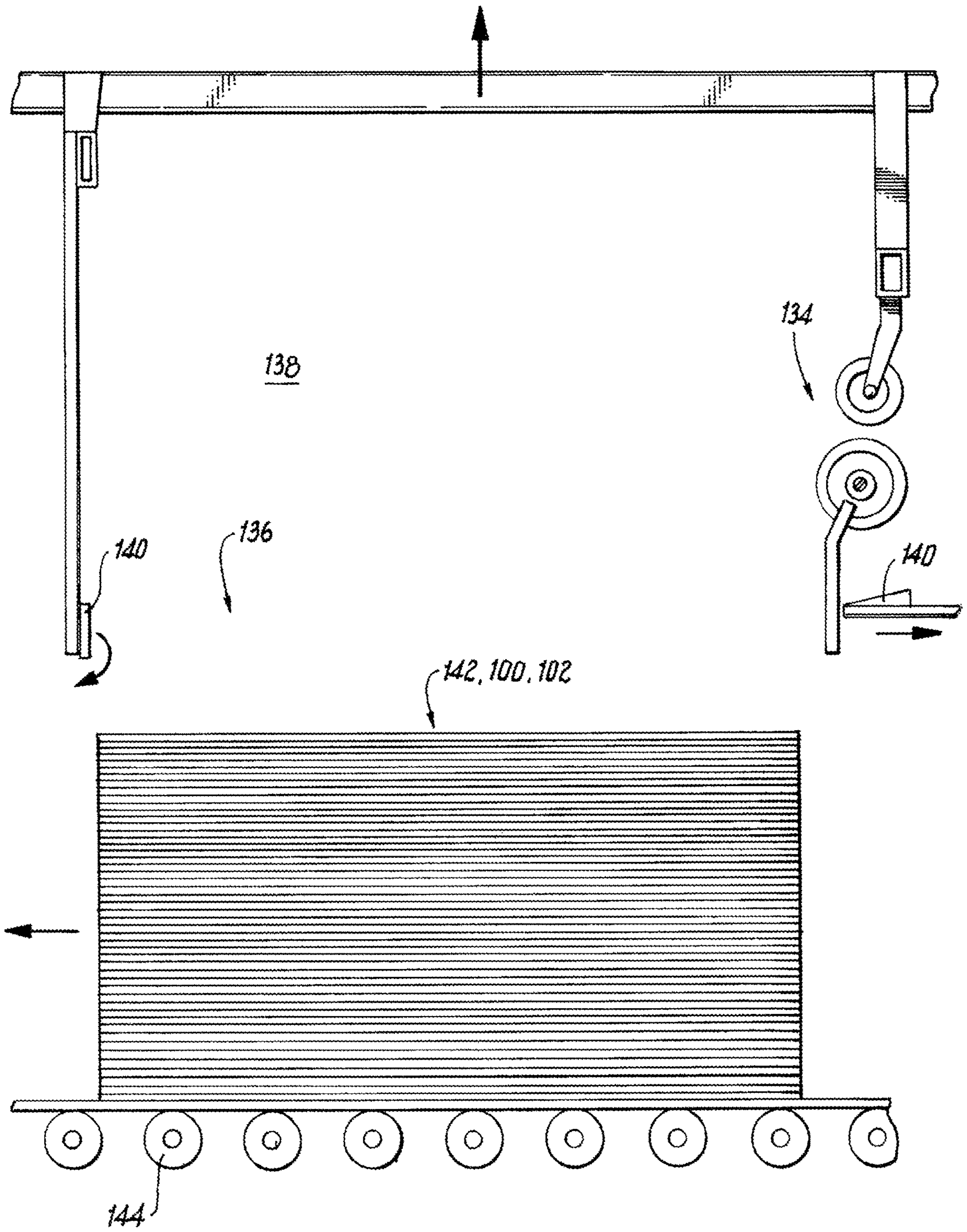
FIG. 9 is a schematic side elevation view of the process of FIGS. 5-8, showing the stack of arrays of packaging blanks lowered to the conveyor.

With reference now to FIG. 5, a method includes feeding a stream of stock material sheets 132 from a rotary die cutter (not pictured but located e.g. off the page to the right as oriented in FIG. 5) to a stacker system feed rollers 134 and feeding each sheet 132 in the stream of stock material sheets into an array 100 of packaging blanks 102 as described above. As shown in FIG. 6, the method includes collecting a batch 136 of the arrays 100 of packaging blanks 102 from the stacker system feed rollers 134 into a stack 142 in the hopper 138. FIGS. 7-8 show the batch 136 accumulating. As shown in FIG. 9, the method includes opening a pair of ledges 140 of the hopper system 138 to drop the stack 142 down onto a conveyor 144, and conveying the stack away from the rotary die cutter and from the hopper system 138. Upon ejection of the stack 142, the hopper system 138 raises up (towards the top of the page as oriented in FIG. 8) and the stack 142 ejects to the left as indicated by the arrow in FIG. 8. The conveyor 144 is oriented to move the stack 142 to the left as oriented in FIG. 8 when the hopper system 138 has risen to clear the stack 142.

With reference again to FIGS. 6, a gap 146 separates the pair of ledges 140 of the hopper 136. The gap 146 has a gap width G1. The packaging blanks of the arrays of packaging blanks each have a widest width G3, labeled in FIG. 1, that is narrower than the first width G1. However, with the struts 108, e.g. labeled in FIG. 1, each of the arrays 100 of packaging blanks 102 has a widest width G2 that is wider than the gap width G1 to suspend the stack 142 (labeled in FIG. 9) across the gap 146. The struts 108 are oriented in FIGS. 5-8 in the direction from left to right as indicated by the dimension arrows for the width G2. The first and second lines of weakness 110, 112 (labeled in FIG. 1) are strong enough to suspend the stack 142 across the gap 146, but weak enough to break when separating the packaging blanks 102 from the struts 108 (labeled in FIG. 1) rather than tearing the packaging blanks 102 or the struts 108. Is it worth noting that without the strut 108, line of weakness 126 (labeled in FIG. 1) would fold inward when stacking and cause a jam. The strut 108 holds the array 100 together so that the blanks 102 do not fold at the lines of weakness 126 during stacking where they would otherwise fold.

Figure 10:
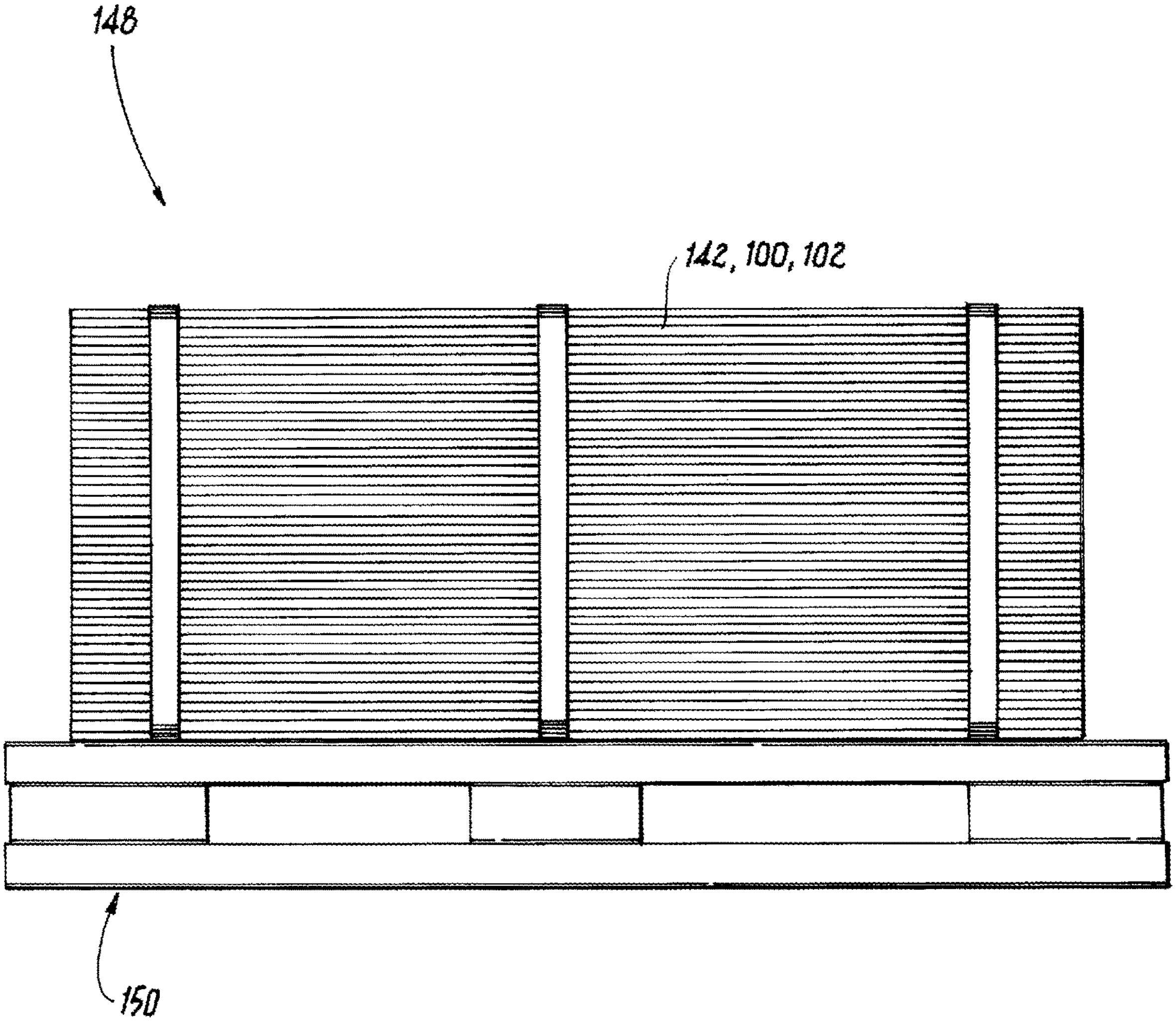
FIG. 10 is a schematic side elevation view of the stack of arrays of packaging blanks of FIG. 9 in a palletized condition.

With reference now to FIG. 10, the method includes palletizing the stack 142 onto a shipping pallet 150 for shipping as a palletized product 148. The arrays 100 in the palletized product 148 have their the lines of weakness 110, 112 (labeled in FIG. 1) connecting the struts 108 (labeled in FIG. 1) to the packaging blanks 102 (labeled in FIG. 1) still intact. The struts 108 (labeled in FIG. 1) of each of the arrays 100 of packaging blanks 102 are aligned with one another on the pallet 150, i.e. the struts 108 are all oriented left to right as oriented in FIG. 10.

Adding a connecting strut 108 as labeled in FIG. 1 to a die layout allows rotary equipment to run smaller blanks than would be normally possible. This allows for a lower amount of labor to produce these smaller items when compared to flatbed die-cutting machines that normally die-cut small blanks.

The methods and systems of the present disclosure, as described above and shown in the drawings, provide for cut packaging blanks on a rotary cutting die wherein the packaging blanks are too small for traditional methods of using the rotary cutting dies. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An array of packaging blanks for containers comprising:
- a first set of one or more packaging blanks;
- a second set of one or more packaging blanks; and
- a strut between the first set the second set, wherein the strut is connected to the first set by a first line of weakness configured to be broken to separate the first set from the strut, and wherein the strut is connected to the second set by a second line of weakness configured to be broken to separate the second set from the strut.

2. The array of packaging blanks for containers as recited in claim 1, wherein each packaging blank in the first and second sets includes a main panel and a plurality of wall panels each foldably connected to the main panel, wherein the plurality of wall panels are configured to be erected along respective fold lines about an interior space in cooperation with the main panel to form a respective container.

3. The array of packaging blanks as recited in claim 2, wherein the strut is rectangular and connects to one respective wall panel of each of the packaging blanks in the first and second sets.

4. The array of packaging blanks as recited in claim 3, wherein the strut has two long edges and two short edges, wherein the long edges are connected to the one respective wall panel of each of the packaging blanks in the first and second sets.

5. The array of packaging blanks as recited in claim 1, wherein the first set includes two packing blanks connected to one another along a line of weakness connecting wall panels of the two packaging blanks, and wherein the second set includes two packaging blanks connected to one another along a line of weakness connecting wall panels of the two wall panels of the second set.

6. The array of packaging blanks as recited in claim 1, wherein the first and second lines of weakness each include at least one micro-perforated portion.

7. The array of packaging blanks as recited in in claim 6, wherein the first and second lines of weakness each include an alternating pattern of cut portions and micro-perforated portions.

8. The array of packaging blanks as recited in claim 1, wherein each of the packaging blanks of the first and second sets includes a single shaped panel for use as a basepad.

9. The array of packaging blanks as recited in claim 1, wherein each of the packaging blanks of the first and second sets includes a plurality of foldably connected panels configured for use as an interconnecting divider.

10. The array of packaging blanks as recited in claim 1, wherein each of the packaging blanks of the first and second sets includes a plurality of foldably connected panels configured for use as a multiwall interconnecting divider.

11. A palletized product comprising:
- a pallet; and
- a stack of arrays of packaging blanks, each as recited in claim 1, wherein the struts of each of the arrays of packaging blanks are aligned.

12. A method comprising:
- feeding a stream of stock material sheets to a rotary die cutter;
- cutting each sheet in the stream of stock material sheets into an array of packaging blanks as recited in claim 1;
- collecting a batch of the arrays of packaging blanks from the rotary die cutter into a stack a hopper;
- opening a pair of ledges of the hopper to drop the stack down onto a conveyor; and
- conveying the stack away from the rotary die cutter and from the hopper.

13. The method as recited in claim 12, wherein a gap separates the pair of ledges of the hopper, wherein the gap has a gap width, wherein the packaging blanks of the arrays of packaging blanks each have a widest width that is narrower than the gap width, and wherein each of the arrays of packaging blanks has a widest width that is wider than the gap width to suspend the stack across the gap.

14. The method as recited in claim 13, wherein the first and second lines of weakness are strong enough to suspend the stack across the gap, but weak enough to break when separating the packaging blanks from the struts rather than tearing the packaging blanks or the struts.

15. The method as recited in claim 12, further comprising palletizing the stack for shipping.

* * * * *